United States Patent Office 3,697,385
Patented Oct. 10, 1972

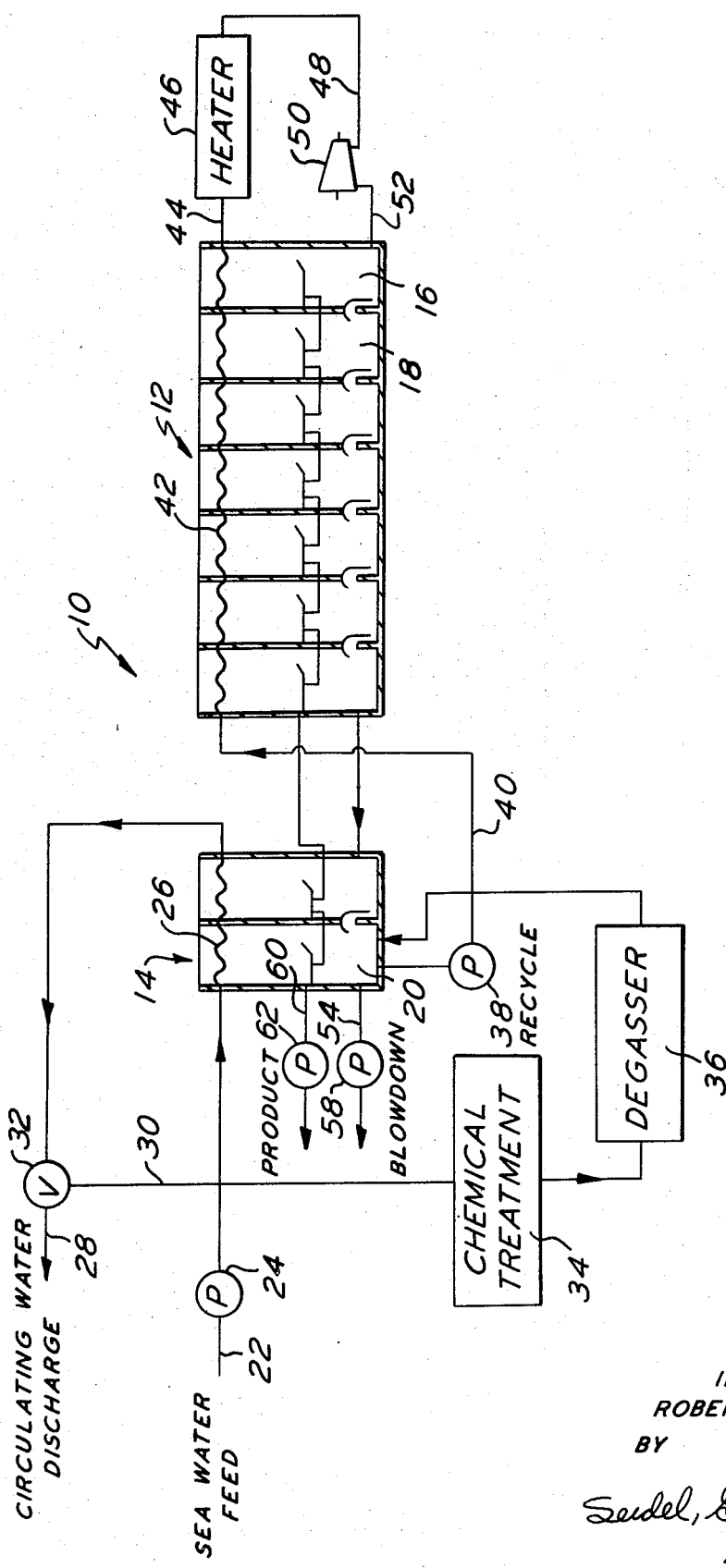

3,697,385
FLASH DISTILLATION APPARATUS AND METHOD
Robert A. Tidball, Swarthmore, Pa., assignor to Aerojet-General Corporation, El Monte, Calif.
Filed Oct. 6, 1970, Ser. No. 78,534
Int. Cl. B01d 3/00, 3/02, 3/10
U.S. Cl. 203—11                 9 Claims

ABSTRACT OF THE DISCLOSURE

A flash distillation apparatus and method wherein fluid energy in unflashed distilland is recovered in the form of useable mechanical energy. The apparatus has a series of flash evaporation stages, condenser tubes associated with the stages through which distilland passes as a condensing medium, a heater for heating of the distilland after it emerges from the condenser tubes, a pump for circulating the distilland, and a turbine for receiving heated distilland prior to flashing of the distilland. The turbine serves to reduce distilland pressure prior to introduction of the distilland into a first distillation stage, and to produce mechanical energy which may be used to supply the energy requirements of the apparatus.

---

This invention relates to a flash distillation apparatus and method, and more particularly, an apparatus and method wherein energy in heated but unflashed distilland is recovered in the form of mechanical energy.

In one form of prior art flash distillation apparatus, especially useful in the desalination of sea water, raw sea water is subjected to the following treatment: first, scale-forming constituents in the sea water are at least partly removed by chemical or other means; next, the treated sea water is passed through condenser tubes associated with a series of evaporation stages, the direction of distilland flow in the tubes being from lower temperature to higher temperature stages. Next, the distilland is further heated to a maximum temperature, passed through a pressure reducing valve, and then introduced into the flash chamber of the evaporation stage of highest temperature and pressure. Thereafter, the distilland passes through stages of successively lower temperature and pressure, wherein portions of it are evaporated in succession, the resulting vapors being condensed to form the product distillate.

In one commonly used method and apparatus, the incoming sea water distilland, after treatment to remove scale-forming constituents, is mixed with the unflashed concentrated brine in the evaporation stage of lowest temperature and pressure prior to being passed through the condenser tubes. Circulation of the treated sea water distilland and the unflashed concentrated brine ("recycle" brine) is accomplished by a recycle pump, whose energy requirements constitute a large part of the total external energy requirements for the entire apparatus. The pump draws brine from the last distillation stage, pumps the brine through the condenser tubes and brine heater, and then to the first stage flash chamber. Thus, the above-mentioned pump must supply the energy to overcome (a) friction losses in the pipes and tubing, (b) hydraulic losses due to entrances, exits and flow discontinuities in manifolds, water boxes and the like, and (c) the pressure difference between the vacuum condition in the last evaporation stage and the pressure of the first evaporation stage. By way of illustration, but not limitation, in a plant operating with a last stage temperature of 92° F., and a brine heater outlet of 250° F., the pump must increase the pressure of the brine from approximately 1.5 inches of mercury absolute (.73 p.s.i.) in the last evaporation stage to a pressure of at least 15 p.s.i. gage at the brine heater outlet. This increase in pressure may in some instances represent irrecoverable energy.

In addition, it is necessary to maintain the pressure of the brine in the brine heater at a level sufficiently above saturation pressure at the temperature of the tube walls of the heater to prevent boiling inside the tubes. It is considered sound operating procedure, and customary, to maintain the brine pressure in the heater at a level sufficient to increase the boiling temperature several ° F. above the maximum wall temperature of the heater. Since the required excess pressure is imparted to the brine by the pump, it exists downstream of the pump in the condenser tubes, brine heater and brine heater discharge piping.

It is conventional to reduce the brine pressure prior to entrance of the brine into the flash chamber of the first evaporation stage, by means of a valve or fixed orifice between the brine heater and the first stage. This valve or orifice reduces the brine pressure to the level desired in stage one. However, the energy attributable to the excess brine pressure is inevitably wasted in known prior art methods and apparatus.

Accordingly, it is an object of this invention to provide a flash distillation method and apparatus wherein the energy represented by brine over-pressure is at least partly recovered, and translatable into useful work.

It is another object to provide a flash distillation apparatus and method wherein energy recovered from brine over pressure is used to supply part of the external energy requirements of the apparatus.

One presently preferred form of the apparatus, capable of realizing the foregoing and other objects, comprises a series of flash evaporation stages maintained at successively lower temperatures and pressures, condenser means associated with each of the stages, a pump for circulating unflashed distilland through the condenser means as a condensing medium, heater means for heating the unflashed distilland prior to introduction of the distilland into a first evaporation stage, and means in fluid communication with the heater and the first evaporation stage for reducing the pressure of the unflashed distilland brine prior to introduction of the distilland into the first evaporation stage, the last mentioned means comprising a turbine which reduces the pressure of the unflashed distilland while recovering from it usable mechanical energy. In a preferred form of the apparatus, the energy thus recovered supplies power for the brine pump or other auxiliaries associated with the distillation apparatus.

For the purpose of illustrating the invention, there is shown in the drawing a form which is presently preferred; it being understood, however, that the invention is not limited to the precise arrangement and instrumentalities shown.

There is seen in the drawing, a schematic representation of a multistage flash distilling plant in accordance with the invention.

Referring now to the drawing in detail, wherein like numerals indicate like elements, there is seen a multi-stage flash distillation apparatus, designated generally be the reference numeral 10.

The apparatus 10 comprises a series of evaporation stages, designated generally by the reference numerals 12 and 14, maintained at successively lower temperatures and pressures. Thus, the flash chamber of the first evaporation stage 16 is maintained at a higher temperature and pressure than the next stage 18, and so on. The last evaporation stage, designated by the referetnce numeral 20, has the lowest temperature and pressure.

The illustrated apparatus 10 uses brine recycle, the recycle brine being mixed in the last evaporation stage 20 with fresh sea water feed, treated for removal of scale-forming constituents. Also in the illustrated apparatus 10, which is shown by way of illustration rather than limitation, only a portion of the sea water feed is used as distilland, the remainder being discharged to the sea. In this regard, referring to the drawing, sea water feed is drawn through a feed conduit 22 by a pump 24. From the pump 24, the sea water feed passes through suitable manifolds or water boxes, not shown, into a set of condenser tubes 26 associated with the low temperature "heat rejection" stages of the apparatus 10. After passing through the condenser tubes 26, the sea water feed is divided into a discharge stream, passing through a discharge conduit 28, and a make-up stream, passing through a make-up conduit 30. A suitable flow proportioning valve 32 controls the relative rates of flow in the discharge and make-up streams. Feed in the make-up stream is subjected to conventional chemical and de-gassing treatments, represented schematically by the reference numerals 34 and 36 to at least partly eliminate scale-forming constituents, thus retarding the formation of scale in the apparatus 10.

The make-up stream enters the last evaporation stage 20 wherein, as has already been indicated, it is mixed with brine remaining unevaporated after passage through each of the evaporation stages. A recycle pump 38 withdraws the mixture, which may hereinafter be referred to as unflashed distilland, from the evaporation stage 20, and discharges it into a recycle conduit 40. From the recycle conduit 40, the distilland passes into suitable manifolds, water boxes or the like associated with a set of condenser tubes 42 for the higher temperature or "heat recovery" stages of the apparatus 10. The flow of the unflashed distilland in the condenser tubes 42 is from the stages of lower temperature and pressure toward the higher. From the condenser tubes 42 the distilland enters a suitable conduit 44, and then a heater 46, in which it is heated to its maximum temperature.

From the heater 46, the distilland passes into a heater discharge conduit 48, and then to a turbine 50. From the discharge side of the turbine 50, the distilland passes through a conduit 52 into the flash chamber of the first evaporation stage 16. The distilland is then subjected to evaporation in successive steps until its unflashed remainder reaches the last evaporation stage 20. A portion of the unflashed brine may be moved from the apparatus 10 through a blowdown conduit 54, associated with a blowdown pump 56.

Distilled product is removed by way of a conduit 60 associated with a pump 62.

As has already been explained, the recycle pump 38 provides sufficient head so that distilland in the heater 46 and at the entrance to the heater discharge conduit 48 exists at a pressure in excess of its saturation pressure at the maximum temperature encountered in the heater 46. This over-pressure is converted in the turbine 50 to useable mechanical energy. For example, the turbine shaft can be used to drive an electrical generator, which in turn could be used to reduce the electrical energy required to operate the sea water feed pump 24, the recycle pump 38, the blowdown pump 58 or the product pump 62. As an alternative, the electrical energy thus obtained can be used elsewhere, or sold.

In a theoretical 200 million gallon per day multi-stage flash plant, wherein recycle brine is flashed from 250° F. to 100° F., approximately 1,650 fluid horsepower is available at the turbine inlet if an over-pressure of 3 p.s.i.g. is maintained. In many plants, the over-pressure is on the order of 5 to 10 p.s.i.g., in which case the available fluid horsepower is even greater.

In its method aspect, the invention resides in a technique for performing flash distillation in a multi-stage process, and simultaneously evolving useable mechanical energy, thereby increasing the overall efficiency of the process. The method involves the use of unflashed distilland as a condensing medium for a series of flash evaporation stages to regeneratively heat the distilland; then further heating the distilland to a maximum temperature while maintaining it at a pressure in excess of its saturation pressure for the maximum temperature of the heater walls; and then reducing the pressure of the distilland in an apparatus capable of converting the fluid energy represented by such pressure to useful mechanical energy. The thus-evolved energy may be used in turn to provide part of the energy requirements for the process.

The present invention may be embodied in other specific forms without departing from the spirit or essential attributes thereof and, accordingly, reference should be made to the appended claims, rather than to the foregoing specification as indicating the scope of the invention.

I claim:

1. Distillation apparatus comprising a series of flash evaporation stages adapted to be maintained at successively lower temperatures and pressures, condenser means associated with each of the stages, a pump for circulating unflashed distilland through the condenser means as a condensing medium, heater means for heating the unflashed distilland prior to introduction of the distilland into a first evaporation stage, and means in fluid communication with said heater means and the first evaporation stage for reducing the pressure of the unflashed distilland prior to introduction of the distilland into said first evaporation stage, said last mentioned means comprising a turbine for recovering useable mechanical energy from the distilland.

2. Distillation apparatus in accordance with claim 1, wherein said pump is a recycle pump, and the unflashed distilland comprises recycle and fresh distilland.

3. Apparatus in accordance with claim 1, wherein said turbine is operatively connected with said pump to provide at least part of the energy requirements of said pump.

4. Apparatus in accordance with claim 3, wherein said pump is a recycle pump, and the unflashed distilland comprises recycle and fresh distilland.

5. A method of flash distillation comprising the steps of maintaining a series of flash evaporation stages at successively lower temperatures and pressures, passing distilland through the respective stages from the lowest to the highest temperature stage as a condensing medium to condense vapor evolved in the stages and to regeneratively heat the distilland, then further heating the distilland to a maximum temperature, maintaining the pressure of the distilland at an excess over the saturation pressure corresponding to the maximum temperature, and passing the distilland through a turbine to reduce its pressure prior to its production into a first evaporation stage and to recover useable mechanical energy from the excess pressure.

6. A method in accordance with claim 5, wherein the pressure of the distilland is maintained at an excess over its saturation pressure corresponding to the maximum wall temperature contacted by the distilland.

7. A method in accordance with claim 6 wherein the excess pressure is between three and ten p.s.i.g.

8. A method in accordance with claim 6, wherein the distilland comprises a mixture of descaled sea water make-up and unflashed brine.

9. A method in accordance with claim 8, wherein the excess pressure is between three and ten p.s.i.g.

References Cited

UNITED STATES PATENTS

| | | | |
|---|---|---|---|
| 884,417 | 4/1908 | Rateau | 60—56 |
| 2,908,618 | 10/1959 | Bethon | 202—174 |
| 3,398,059 | 8/1968 | Cane et al. | 159—2 MS X |

FOREIGN PATENTS

| | | | |
|---|---|---|---|
| 3,113 | 1906 | Great Britain | 60—56 |

OTHER REFERENCES

Jones & Hawkins—"Engineering Thermodynamics," John Wiley & Sons, 1963, pp. 628, 629.

NORMAN YUDKOFF, Primary Examiner

J. SOFER, Assistant Examiner

U.S. Cl. X.R.

202—173; 60—64